(12) United States Patent
Jung

(10) Patent No.: US 6,356,425 B1
(45) Date of Patent: Mar. 12, 2002

(54) TIMER-THERMAL-OVERLOAD SHUTOFF APPARATUS

(76) Inventor: Koock Elan Jung, 564 Lockhart Mountain Rd., Lake George, NY (US) 12845

(*) Notice: Subject to any disclaimer, the term of this patent is extended or adjusted under 35 U.S.C. 154(b) by 0 days.

(21) Appl. No.: 09/545,215

(22) Filed: Apr. 7, 2000

(51) Int. Cl.⁷ .............................. H02H 3/00; H02H 5/04
(52) U.S. Cl. ...................... 361/93.8; 361/93.9; 361/94; 361/103; 307/96; 307/141
(58) Field of Search ................... 361/93.1, 93.8, 361/94, 93.9, 103, 161, 195; 307/211, 96, 97, 132 R, 132 T, 141, 140

(56) References Cited

U.S. PATENT DOCUMENTS

| | | |
|---|---|---|
| 4,048,666 A | 9/1977 | Jrie |
| 4,219,741 A | 8/1980 | Von Gunten |
| 4,782,420 A * | 11/1988 | Holdgaard-Jesen .......... 361/58 |
| 5,397,930 A | 3/1995 | Nilssen |
| 5,945,017 A * | 8/1999 | Cheng et al. ............. 219/466.1 |
| 6,005,761 A * | 12/1999 | Izawa et al. ................. 361/103 |

* cited by examiner

Primary Examiner—Kim Huynh

(57) ABSTRACT

A timer-thermal shutoff apparatus can control and protect an electrical appliance. The timer-thermal shutoff apparatus comprises a housing; male connector extending from the housing; female receptacle to receive a male connector from one or more electrical appliances; timer device; and thermal safety device. The timer device and thermal safety device are connected in series with the male connector and female connector receptacle to form a current path. The electrical appliance is in series with the timer device and thermal safety device. The timer device can control off-on switching and cycles for the electrical apparatus connected to the timer-thermal shutoff apparatus, and the thermal safety device providing thermal overload protection if at least one of the timer-thermal shutoff apparatus and electrical appliance reach a temperature so the thermal safety device opens the current path to protect at least one of the timer-thermal shutoff apparatus and electrical appliance.

19 Claims, 4 Drawing Sheets

| APPLIANCE | ON | OFF |
|---|---|---|
| COFFEE POT | ○ | ◉ |
| ELECTRIC BLANKET | ○ | ○ |
| ⋮ | ⋮ | ⋮ |
| STOVE | ○ | ○ |
| LIGHT | ◉ | ○ |

*fig. 3*

TIMER-THERMAL-OVERLOAD SHUTOFF APPARATUS

BACKGROUND OF THE INVENTION

The invention relates to an electrical safety device. particular, the invention relates to an electrical safety device the permits at least one electrical device to be plugged therein for control by at least one timer device and thermal protection device.

Timer devices for electrical appliances are known in the art. Timer devices are typically plugged into a wall outlet. Electrical appliances may be plugged into a timer device and a timer apparatus can set to control the off-on functions of the electrical appliance. Thus a user of the electrical appliance need not turn the electrical appliance on and off as the timer apparatus of the timer device will turn the electrical appliance on and off. The timer apparatus of the timer device can be, but are not limited to, a digital timer apparatus, a random timer apparatus, an analog timer apparatus, clock train timer apparatus, and combinations thereof. Power to operate the timer apparatus can be provided by at least one of: the outlet into which the timer device is plugged: a battery that is provided for the timer device; a manually wound spring-like clock train; and combinations thereof.

These timer devices are useful for many applications. For example, timer devices can be used for security, for example by turning a light on and off; for convenience purposes, for example by turning coffee makers and other such appliances on and off at desired times; and for efficiency purposes, for example for assuring that heaters, electric blankets, and the like are turned on prior to use.

Timer devices are not known to include safety measures, devices, and systems to assure that the respective electrical appliances are not overloaded. If an electrical appliance is overloaded, there is a potential for fire due to high temperatures caused by the overloading. Further, the lack of safety devices in timer devices may also cause potentially hazardous short circuits in the electrical appliance and FIG. 1 or associated electrical circuit into which the timer device and electrical appliance is plugged into.

Therefore, a need exists for a timer device with a thermal safety device to protect against overloading and overheating. Also, a need exists for a timer device with a high current safety device to protect against short circuits.

SUMMARY OF THE INVENTION

An aspect of the invention provides a timer-thermal shutoff apparatus. The timer-thermal shutoff apparatus can control and protect an electrical appliance. The timer-thermal shutoff apparatus comprises a housing; at least one male connector extending from the housing; at least one female receptacle in the housing, the female receptacle adapted to receive a male connector from one or more electrical appliances; at least one timer device; and at least one thermal safety device. The at least one timer device and the at least one thermal safety device are connected in series with the at least one male connector and the at least one female connector receptacle to form a current path. The electrical appliance that is connected into the at least one female receptacle connector is in series with the at least one timer device and the at least one thermal safety device. The at least one timer device being able to be set for controlling off-on switching and on-off cycles for the electrical apparatus connected to the timer-thermal shutoff apparatus, and the thermal safety device providing thermal overload protection if at least one of the timer-thermal shutoff apparatus and the electrical appliance reach a temperature so the thermal safety device opens the current path the timer-thermal shutoff apparatus to protect at least one of the timer-thermal shutoff apparatus and electrical appliance.

A further aspect of the invention provides a timer-thermal shutoff apparatus for controlling and protecting at least one electrical appliance. The timer-thermal shutoff apparatus comprises a housing; at least one male connector extending from the housing; at least one female receptacle in the housing, the female receptacle adapted to receive a male connector from one or more electrical appliances; at least one timer device; a high current protection device that can provide further protection for the electrical appliance; and at least one thermal safety device. The thermal safety device comprises at least one of: a thermostat; thermally activated switch; bimetal switch; dielectric switch; thermal fuse; temperature responsive current limiter; fixed or adjustable thermostat; thermisters; and combinations thereof. The at least one timer device and the at least one thermal safety device are connected in series with the at least one male connector and the at least one female connector receptacle to form a current path, so an electrical appliance that is connected into the at least one female receptacle connector is in series with the at least one timer device and the at least one thermal safety device. The at least one timer device being able to be set for controlling off-on switching and on-off cycles for the electrical apparatus connected to the timer-thermal shutoff apparatus, and the thermal safety device providing thermal overload protection if at least one of the timer-thermal shutoff apparatus and the electrical appliance reach a temperature so the thermal safety device opens the current path through the timer-thermal shutoff apparatus to protect at least one of the timer-thermal shutoff apparatus and electrical appliance.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 3 is a schematic illustration of a display that can be used in cooperation with a thermal safety device, as embodied by the invention.

DETAILED DESCRIPTION OF THE INVENTION

Figure 1:
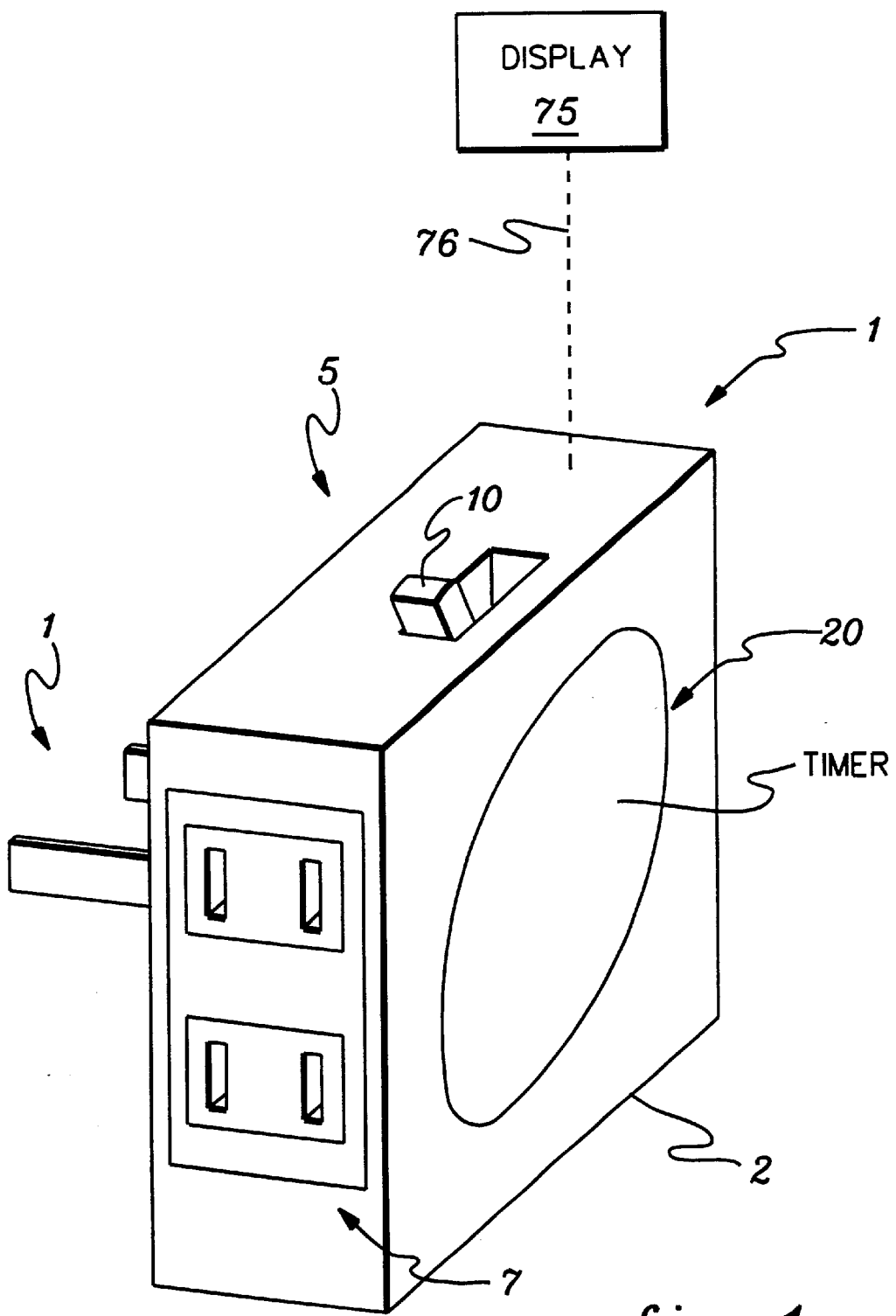
FIG. 1 is a schematic illustration of a timer device with a thermal safety device, as embodied by the invention.

The invention, as set forth herein, provides a timer device comprising a timer apparatus and a thermal safety device (hereinafter collectively referred to as a "timer-thermal shutoff apparatus". An exemplary timer-thermal shutoff apparatus 1, as embodied by the invention, is illustrated in FIG. 1. The timer-thermal shutoff apparatus 1 comprises a housing 2, which can take any appropriate configuration formed of suitable materials, and at least one male connector 5 that is plugged into an outlet (not illustrated), for example a wall outlet. FIG. 1 illustrates the housing 2 as generally rectangular in configuration, however, this configuration is merely exemplary of the configurations within the scope of the invention. For example, the housing 2 may comprise at least one of a cylindrical housing, spherical housing, polygonal housing, and other geometrical configuration housings.

The timer-thermal shutoff apparatus 1 also comprises at least one female receptacle or connector 7. The female connector 7 accepts male connectors 9 (FIG. 2) from an electrical appliance 100 or other device (hereinafter referred to as "electrical appliance", which is not to be construed as limiting of the invention). The electrical appliance is to be controlled and protected by the timer-thermal shutoff apparatus 1. The timer-thermal shutoff apparatus 1 comprises a timer apparatus 20 (as described hereinafter). The timer apparatus 20 can control the on-off switching functions of the electrical appliance 100 that is connected to the timer-thermal shutoff apparatus 1. The timer apparatus 20 can thus limit and control an amount of time that an electrical appliance 100 has power supplied to it through the timer-thermal shutoff apparatus 1.

The timer device 20 in the timer-thermal shutoff apparatus 1, as embodied by the invention, can comprise at least one of a digital timer apparatus, a random timer apparatus, an analog timer apparatus, clock train timer apparatus, and combinations thereof. Further, the timer device 20 can be provided with power for operation. The power for the timer-thermal shutoff apparatus 1 can be provided by at least one of: the outlet (not illustrated) into which the timer-thermal shutoff apparatus 1 is plugged (AC); a battery (DC) that can provide power to the timer device 20; a manually wound spring-like clock train; and combinations thereof. The timer device 20 may comprise a programmable timer device, and alternatively the timer device 20 may comprise a random or random/programmable timer. The battery that can provide power to the timer device 20 is able to maintain power to the timer device 20. Thus, regardless of status of power supplied to the timer-thermal shutoff apparatus, the timer device 20 will maintain its operation and the timer device will still keep time. Accordingly, the timer-thermal shutoff apparatus will still keep accurate timed control of the electrical appliance 100, even if power has been lost. Further, the timer-thermal shutoff apparatus 1, which includes the battery power to the timer device 20, will still be able to provide control of the electrical appliance, for example if power were to be lost and then re-connected, without the need for resetting the time kept y the timer device 20.

The timer-thermal shutoff apparatus 1 also comprises a thermal safety device 50. For example, and in no way limiting of the invention, the thermal safety device 50 can comprise a thermal control. The thermal safety device 50 can will sense a temperature in at least one of: the timer-thermal shutoff apparatus 1 and electrical appliance 100. If the temperature in the timer-thermal shutoff apparatus 1 and electrical appliance 100 reaches a preset temperature, the thermal safety device 50 can open a circuit path through the timer-thermal shutoff apparatus 1. The current path through the timer-thermal shutoff apparatus 1 comprises timer-thermal shutoff apparatus features in line with and inclusive of the plugs 5 to the female sockets The preset temperature of either or both of the timer-thermal shutoff apparatus and the electrical appliance can be predetermined to avoid overheating of at least one of the timer-thermal shutoff apparatus 1 and electrical apparatus 100. The preset temperature, at which the thermal safety device 50 opens the current path through the timer-thermal shutoff apparatus 1, can be determined by at least one of the user of the timer-thermal shutoff apparatus 1, by the specifications of the electrical appliance 100, by the specifications of the timer-thermal shutoff apparatus 50, and combinations thereof.

The thermal safety device 50 can comprise any appropriate device that can be shut down current flow through the current path in the timer-thermal shutoff apparatus 1 if a preset temperature is encountered. The thermal safety device 50 can comprise at least one of: a thermostat; thermally activated switch; bimetal switch; dielectric switch; thermal fuse; temperature responsive current limiter; fixed or adjustable thermostat; thermistors; and combinations thereof. The thermal safety device 50 can take any of form that may be able to open the current path if the preset temperature is encountered.

Further, the timer-thermal shutoff apparatus 1, as embodied by the invention, may comprise a high current (short circuit) protection device 40. The high current protection device 40 can be used with the thermal safety device 50 to provide further protection for the electrical appliance 100 used in conjunction with the timer-thermal shutoff apparatus 1. The high current protection device 40 can comprise an electrical device that can open the current path through the timer-thermal shutoff apparatus 1, if a high current event occurs. The high current event can comprise a short circuit, surge of electrical energy, high voltage surge, and other such electrical events.

The high current protection device 40 can comprise any appropriate device that opens the current path if a high current event is encountered by at least one of the timer-thermal shutoff apparatus 1 and the electrical appliance 100. For example, and in no way limiting of the invention, the high current protection device 40 can comprise at least one of: a voltage sensor; a digital voltage sensor; a current limiter; a surge protector; a surge suppresser; a surge arrester; a varistor; a resistor; a positive temperature coefficient (PTC or PTCR) device; and combinations thereof.

Also, the timer-thermal shutoff apparatus 1 may comprise a manual override control 10. The manual override control 10 is provided for a user to bypass the timer device 20 and other features of the timer-thermal shutoff apparatus 1 including those in the current path. The manual override control 10 can be used with the timer-thermal shutoff apparatus 1 for any number of electrical appliances.

Further, the manual override control 10 can be used alone or in combination with anyone of the timer-thermal shutoff apparatus 1 and the thermal safety device 50, with or without other timer-thermal shutoff apparatus 1 features, such as but not limited to the timer device 20 and the high current protection device 40.

The manual override control 10 comprises a switch that the user of the timer-thermal shutoff apparatus 1 can control the flow of current through the current path. The manual override control 10 is movable from a first position, which is its normal position, that provides a current path through the timer device 20, thermal safety device 50, and the high current protection device 40 (if provided). This current path 66 is indicated by dashed lines in FIG. 2, with the manual override control 10 in the position indicated by dashed lines.

The manual override control 10 can be moved to a second position that opens the current path 66 through the timer device 20, thermal safety device 50, and the high current protection device 40 (if provided). The manual override control 10 when moved to a second position that opens the current path 66 through the timer device 20, thermal safety device 50, and the high current protection device 40 (if provided), and closed a current path 67 (FIG. 2) that bypasses the timer device 20, thermal safety device 50, and the high current protection device 40 (if provided). The current path 67 provides a direct current path that is not subjected to the controls of the timer-thermal shutoff apparatus 1, as embodied by the invention.

The manual override control 10 can comprise any appropriate switching device that can be moved between tow distinct positions. For example, and in no way limiting of the invention, the manual override control 10 can comprise a rotary switch, a slide switch, a push button switch, and other such switches. A normal or rest position of the manual override control 10 provides the timer-thermal shutoff apparatus 1, as embodied by the invention, for current flow through the thermal safety device 50 for protection purposes.

The timer-thermal shutoff apparatus 1 may be used in cooperation with a display device 75 (illustrated in block form in FIG. 1).

The display device 75 can comprise a master display panel that indicates a status of the timer-thermal shutoff apparatus 1 is connected to the timer-thermal shutoff apparatus 1 for communication therewith. The display device 75 or master display panel (hereinafter referred to as "display device 75") can be provided on the housing 2 of a timer-thermal shutoff apparatus 1. Alternatively, the display device 75 can be provided as a separate element with respect to the timer-thermal shutoff apparatus 1, thus forming a timer-thermal shutoff apparatus system 200, as embodied by the invention, and described with respect to FIG. 4 hereinafter.

Further, the display device 75 may be connected to one timer-thermal shutoff apparatus 1 or a plurality of timer-thermal shutoff apparatus 1, as embodied by the invention. The following description of FIGS. 2 and 3 will describe the display device 75 in cooperation with one timer-thermal shutoff apparatus 1, however this description is merely exemplary and is not intended to limit the invention in any manner. The scope of the invention comprises any number of timer-thermal shutoff apparatus 1 being connected to one or more display devices 75.

The display device 75 can provide a user of the timer-thermal shutoff apparatus 1 with an indication of the status of at least one of the timer-thermal shutoff apparatus 1, and, if desired, any electrical appliance 100 connected thereto. The display device 75 may comprise controls for activation and inactivation of the thermal safety device 50, setting and controlling the timer device 20, activation and inactivation of the high current protection device 40, activation and inactivation of the manual override control 10, combinations thereof, and generalized overall operation of the timer-thermal shutoff apparatus 1.

The display device 75 may be in communication with the timer-thermal shutoff apparatus 1, which is connected thereto, by any appropriate communications link 76. The communications link 76 may include at least one of: hard-wire communications links, radio communication, wireless communications links, Internet communications links, Intranet communications links, RF communications links, cellular communications links, related communications links, and combinations thereof.

The indicia that is provided with the display device 75 can take any appropriate form, in which the indicia would provide information to a user of the timer-thermal shutoff apparatus 1. The indicia would provide information as to what, if any, electrical appliances are being controlled via the timer device 20 of the timer-thermal shutoff apparatus 1. The display device 75 can also provide other information to a user, for example remaining time in a timer cycle that an electrical appliance would be "on" or "off", what electrical appliance(s) is (are) being controlled, and other such information that would be useful monitored information to a user.

The display device 75 may be positioned in an appropriate location at which the information is available to the user. These locations include, but are not limited to, near doors, in bedrooms, and any other location at which the information can be discerned by a user. The display device 75, for example as set forth in FIG. 3, can comprise any form of a display, including but not limited to printed matter and indicia, lights, numerical indication of the off-on times set by the timer device 20, the electrical appliances connected to the timer-thermal shutoff apparatus 1 and the status of those, such as either on or off, and other appropriate displays that would convey useful information concerning the timer-thermal shutoff apparatus. The matter illustrated in FIG. 3 is merely exemplary, and is not intended to limit the timer-thermal shutoff apparatus in any manner.

Figure 4:
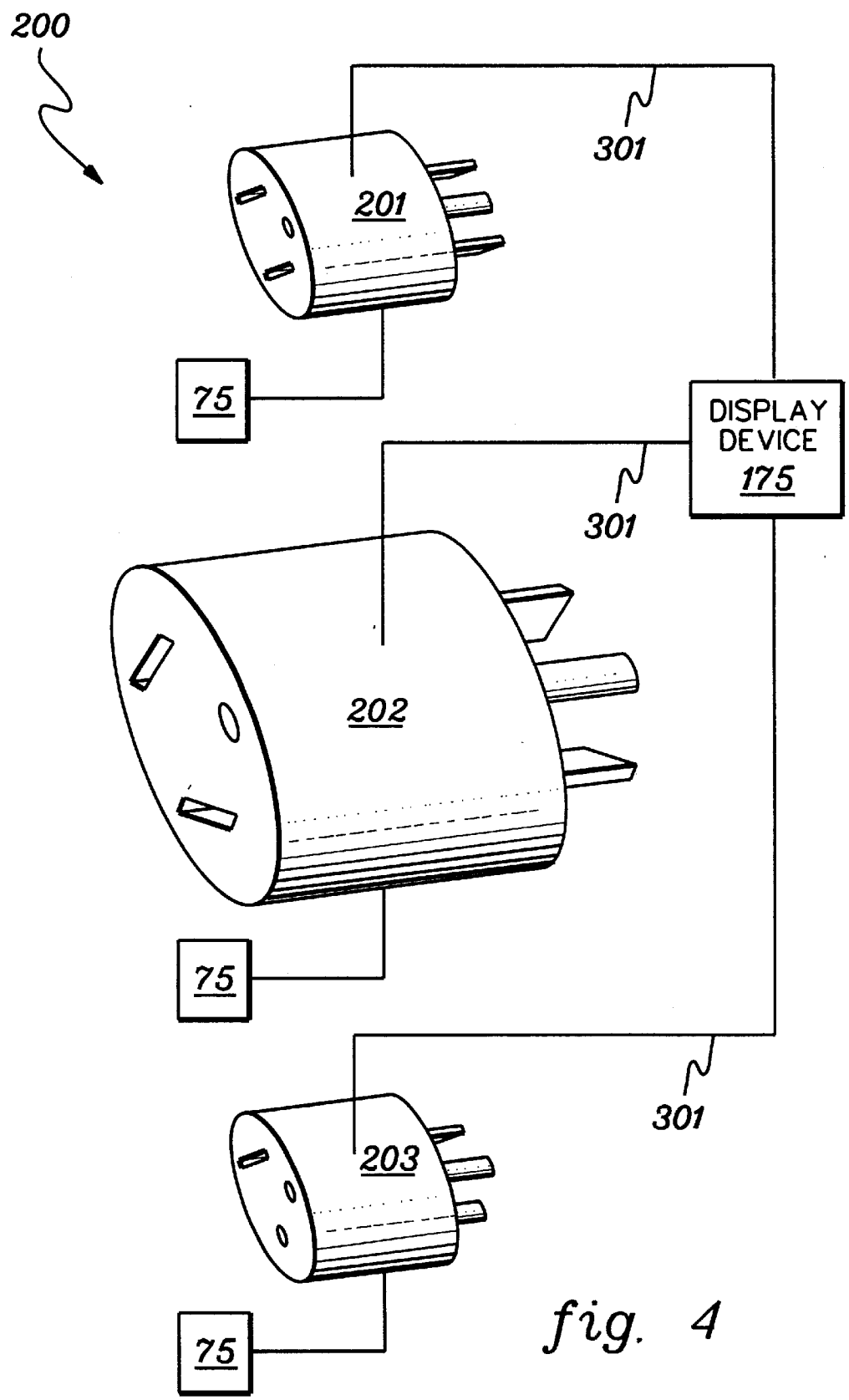
FIG. 4 is a schematic illustration of a timer-thermal shutoff apparatus system comprising a plurality of timer devices each including a thermal safety device in cooperation with master display panel, as embodied by the invention.

Alternatively, one or more timer-thermal shutoff apparatuses can be provided in combination with other timer-thermal shutoff apparatuses. Further, the one or more timer-thermal shutoff apparatuses can be provided with one or more display device 75, as embodied by the invention. FIG. 4 illustrates a timer-thermal shutoff apparatus system 200 comprising a plurality of timer-thermal shutoff apparatuses in cooperation with master display panel 175, in which the features are connected by communications links 301. In FIG. 4, like features are indicated with similar reference characters.

In FIG. 4, the timer-thermal shutoff apparatus system 200 comprises a plurality of timer-thermal shutoff apparatuses, 201, 202, and 203. Each of the timer-thermal shutoff apparatuses 201, 202, and 203 is connected to a display device 175. The display device 175 can be located on each of the timer-thermal shutoff apparatus 201, 202, and 203; can be located on any one of the timer-thermal shutoff apparatuses 201, 202, and 203; located at a remote position (as discussed above), and combinations thereof.

Further, each of the timer-thermal shutoff apparatuses, 201, 202, and 203 can be connected to a display device 75 (FIG. 4). The connection to the display device 75 from each of the timer-thermal shutoff apparatuses, 201, 202, and 203, may be in addition to a connection to a master display device 175. The display device 75 on each of the timer-thermal shutoff apparatuses, 201, 202, and 203, and in the embodiments described above, may be provided integral with the timer-thermal shutoff apparatus with which it is associated. Alternatively, the display device 75 may be provided separate from the respective timer-thermal shutoff apparatus close thereto, and in conjunction with the mater display device 175. For example, but not limited to, each timer-thermal shutoff apparatus may comprise a display device 75 therewith proximate the timer-thermal shutoff apparatus, such as in a kitchen near the electrical appliance with which it controls, and the mater display device 175, can be remote, for example located remote from the electrical appliance that the timer-thermal shutoff apparatus controls and provides safety features.

In FIG. 4, the timer-thermal shutoff apparatuses 201, 202, and 203 are illustrated with varying configurations, which are exemplary of different timer-thermal shutoff apparatuses within the scope of the invention. The timer-thermal shutoff apparatus 201 is a conventional three-prong plug. The timer-thermal shutoff apparatus 202 comprises a plug for a washer, dryer and the like, while the timer-thermal shutoff apparatus 203 comprises a plug for a specific male/female connector configuration that assures that the plug is correctly placed in electrical connection with an electrical receptacle.

The display device 175 can comprise a display to indicate the status of each timer-thermal shutoff apparatus and electrical appliance connected to the timer-thermal shutoff apparatus system, as embodied by the invention. The display device 175 can comprise a configuration as illustrated in FIG. 3. Alternatively, the display device 175 can also comprise controls for activation and inactivation of the thermal safety device 50, setting and controlling the timer device 20, activation and inactivation of the high current protection device 40, activation and inactivation of the manual override control 10, combinations thereof, and generalized overall operation of the timer-thermal shutoff apparatus 1.

Figure 2:
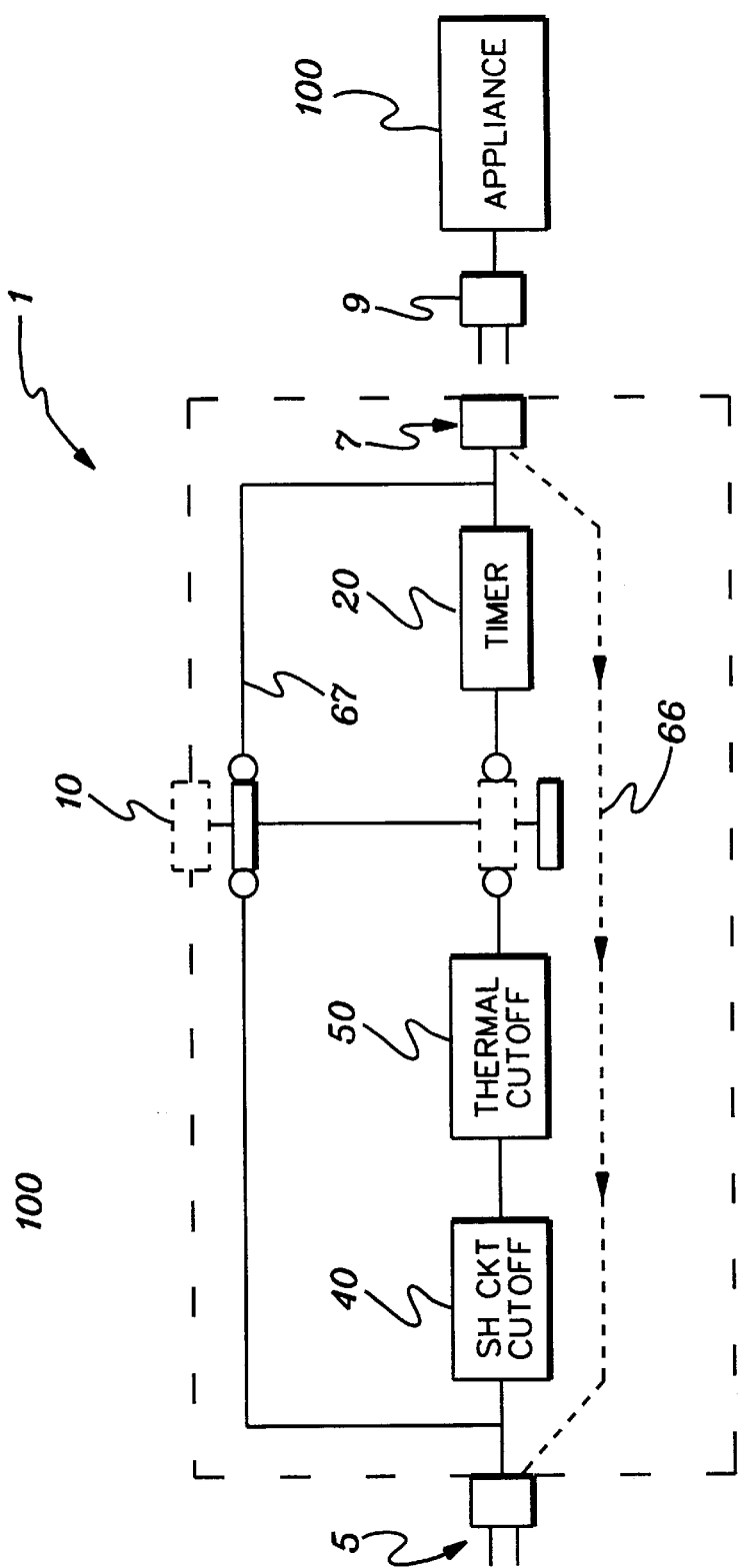
FIG. 2 is a schematic, block diagram of a timer device with a thermal safety device, as embodied by the invention.

The operation of a timer-thermal shutoff apparatus, as embodied by the invention, will now be described with reference to FIGS. 1–3. This description of the operation is merely exemplary of the timer-thermal shutoff apparatus operation, and is not intended to limit the invention in any manner. In operation, a user can plug the timer-thermal shutoff apparatus 1 into an outlet by inserting the connectors 5 into the outlet. A user can then connect an electrical appliance 100 to the female connector 7. The user may then set the off-on cycles in the timer device 20 so the timer-thermal shutoff apparatus 1 can control the operation of the electrical appliance 100. If an overload or other high temperature is encountered in the timer-thermal shutoff apparatus 1 or the electrical appliance 100, the thermal safety device 50 can open the current path through the timer-thermal shutoff apparatus 1 and current to the electrical appliance 100 is stopped.

Further, the high current protection device 40 can operate to open the current path through the timer-thermal shutoff apparatus 1 if a high current event occurs. Furthermore, a user can override the thermal safety device 50 and the high current protection device 40 by disposing the manual override control 10 to the override position.

The timer-thermal shutoff apparatus 1 is described herein with at least one electrical appliance 100 being controlled. This description is not intended to limit the invention, and the timer-thermal shutoff apparatus 1 can be used to protect many electrical devices, including but not limited to, irons, coffee makers, microwaves, dryers, washers, ovens, stoves, lights, stereos, televisions, and other such electrical devices. The exact type of electrical appliance 100 is not material to the timer-thermal shutoff apparatus 1. Other types of electrical appliances 100 and any number of such electrical appliances can be used in conjunction with the timer-thermal shutoff apparatus 1, as embodied by the invention. Further, the timer-thermal shutoff apparatus, as embodied by the invention, can comprise means for programming the timer device, in which the programming means may comprise analog, manual, digital, and other such equivalent means for programming the timer device.

While embodiments of the invention have been described, the present invention is capable of variation and modification, and therefore should not be limited to the description herein. The invention includes changes and alterations that fall within the purview of the following claims. Individual components of the described and illustrated embodiments may be used interchangeably with each other component of the described and illustrated embodiments.

What is claimed:

1. A timer-thermal-overload shutoff apparatus for controlling and protecting at least one electrical appliance, the timer-thermal-overload shutoff apparatus comprising:
   a housing;
   at least one male connector extending from the housing;
   at least one female receptacle in the housing, the female receptacle adapted to receive a male connector from one or more electrical appliances;
   at least one timer device;
   a high current protection device that can provide protection for the electrical appliance and close current flow to the at least one electrical appliance; and
   at least one thermal safety device,
   wherein the at least one timer device, high current protection device, and at least one thermal safety device are connected in series with the at least one male connector and the at least one female connector receptacle to form a current path, so an electrical appliance that is connected into the at least one female receptacle connector is in series with the at least one timer device, high current protection device, and the at least one thermal safety device; the at least one timer device being able to be set for controlling off-on switching and on-off cycles for the electrical apparatus connected to the timer-thermal shutoff apparatus, the thermal safety device providing thermal overload protection if at least one of the timer-thermal shutoff apparatus and the electrical appliance reach a temperature so the thermal safety device opens the current path through the timer-thermal shutoff apparatus to protect at least one of the timer-thermal-overload shutoff apparatus and electrical appliance; and the high current protection device that can provide further protection for the electrical appliance and close current flow to the at least one electrical appliance.

2. The apparatus according to claim 1, the thermal safety device comprises at least one of: a thermostat; thermally activated switch; bimetal switch; dielectric switch; thermal fuse; temperature responsive current limiter; fixed or adjustable thermostat; and thermisters.

3. The apparatus according to claim 2, wherein the high current protection device comprises a device for opening a current path through the timer-thermal-overload shutoff apparatus if a high current event occurs.

4. The apparatus according to claim 1, wherein the high current event can comprise at least one of: a short circuit, surge of electrical energy, and high voltage surge.

5. The apparatus according to claim 1, wherein the high current protection device comprises at least one of: a voltage sensor; a digital voltage sensor; a current limiter; a surge protector; a surge suppresser; a surge arrester; a varistor; a resistor; and a positive temperature coefficient device.

6. The apparatus according to claim 1, the timer-thermal-overload shutoff apparatus further comprising a manual override control for bypassing the timer device, high current protection device, and the thermal safety device.

7. The apparatus according to claim 1, the timer-thermal-overload shutoff apparatus further comprising a first current path through the timer device and the thermal safety device and a second current path that is independent of the timer device and the thermal safety device, wherein the timer-thermal-overload shutoff apparatus further comprises a manual override control for bypassing the timer device and the thermal safety device to supply current directly to the electrical appliance.

8. The apparatus according to claim 1, the timer-thermal-overload shutoff apparatus further comprising a display device that can provide indicia of a status of the timer-thermal-overload shutoff apparatus.

9. The apparatus according to claim 8, wherein the display device is disposed at least at a position in a location visible to a user and on the housing of the timer-thermal-overload shutoff apparatus.

10. The apparatus according to claim 8, wherein the timer-thermal-overload shutoff apparatus communicates its status to the display device via communication links, the communication links selected from at least one of: hardwire communications links, radio communication, wireless communications links, Internet communications links, Intranet communications links, RF communications links, cellular communications links, and related communications links.

11. A timer-thermal-overload shutoff apparatus for controlling and protecting at least one electrical appliance, the timer-thermal-overload shutoff apparatus comprising
a housing;
at least one male connector extending from the housing;
at least one female receptacle in the housing, the female receptacle adapted to receive a male connector from one or more electrical appliances;
at least one timer device;
a high current protection device that can provide protection for the electrical appliance; and
at least one thermal safety device, the thermal safety device comprises at least one of: a thermostat; thermally activated switch; bimetal switch; dielectric switch; thermal fuse; temperature responsive current limiter; fixed or adjustable thermostat; and thermisters;
wherein the at least one timer device, the high current protection device, and the at least one thermal safety device are connected in series with the at least one male connector and the at least one female connector receptacle to form a current path, so an electrical appliance that is connected into the at least one female receptacle connector is in series with the at least one timer device and the at least one thermal safety device, the at least one timer device being able to be set for controlling off-on switching and on-off cycles for the electrical apparatus connected to the timer-thermal-overload shutoff apparatus; and the high current protection device that can provide further protection for the electrical appliance and close current flow to the at least one electrical appliance; and the thermal safety device providing thermal overload protection if at least one of the timer-thermal-overload shutoff apparatus and the electrical appliance reach a temperature so the thermal safety device opens the current path through the timer-thermal-overload shutoff apparatus to protect at least one of the timer-thermal shutoff apparatus and electrical appliance.

12. The apparatus according to claim 11, wherein the high current event can comprise at least one of: a short circuit, surge of electrical energy, and high voltage surge.

13. The apparatus according to claim 12, wherein the high current protection device comprises at least one of: a voltage sensor; a digital voltage sensor; a current limiter; a surge protector; a surge suppresser; a surge arrester; a varistor; a resistor; and a positive temperature coefficient device.

14. The apparatus according to claim 12, the timer-thermal-overload shutoff apparatus further comprising a manual override control for bypassing the timer device and the thermal safety device.

15. The apparatus according to claim 12, the timer-thermal-overload shutoff apparatus further comprising a first current path through the timer device and the thermal safety device and a second current path that is independent of the timer device and the thermal safety device, wherein the timer-thermal-overload shutoff apparatus further comprises a manual override control for bypassing the timer device and the thermal safety device to supply current directly to the electrical appliance.

16. A timer-thermal-overload shutoff apparatus for controlling and protecting at least one electrical appliance, the timer-thermal-overload shutoff apparatus comprising
a housing;
at least one male connector extending from the housing;
at least one female receptacle in the housing, the female receptacle adapted to receive a male connector from one or more electrical appliances;
at least one timer device;
a high current protection device that can provide protection for the electrical appliance;
a display device that can provide indicia of a status of the timer-thermal-overload shutoff apparatus, the display device being disposed in at least one of the housing of the timer-thermal-overload shutoff apparatus and disposed at a position remote from the housing of the timer-thermal-overload shutoff apparatus visible to a user of the timer-thermal-overload shutoff apparatus; and
at least one thermal safety device, the thermal safety device comprises at least one of: a thermostat; thermally activated switch; bimetal switch; dielectric switch; thermal fuse; temperature responsive current limiter; fixed or adjustable thermostat; and thermisters;
wherein the at least one timer device, the high current protection device, and the at least one thermal safety device are connected in series with the at least one male connector and the at least one female connector receptacle to form a current path, so an electrical appliance that is connected into the at least one female receptacle connector is in series with the at least one timer device and the at least one thermal safety device, the at least one timer device being able to be set for controlling off-on switching and on-off cycles for the electrical apparatus connected to the timer-thermal-overload shutoff apparatus, and the high current protection device that can provide further protection for the electrical appliance and close current flow to the at least one electrical appliance, and the thermal safety device providing thermal overload protection if at least one of the timer-thermal-overload thermal shutoff apparatus and the electrical appliance reach a temperature so the thermal safety device opens the current path through the timer-thermal-overload shutoff apparatus to protect at least one of the timer-thermal-overload shutoff apparatus and electrical appliance and the display device is positioned in an location visible to a user.

17. The apparatus according to claim 16, wherein the timer-thermal-overload shutoff apparatus communicates its status to the display device via communication links, the communication links selected from at least one of: hardwire communications links, radio communication, wireless com munications links, Internet communications links, Intranet communications links, RF communications links, cellular communications links, and related communications links.

18. The apparatus according to claim 16, wherein the high current protection device comprises at least one of: a voltage sensor; a digital voltage sensor; a current limiter; a surge protector; a surge suppresser; a surge arrester; a varistor; a resistor; and a positive temperature coefficient device.

19. The apparatus according to claim 16, the timer-thermal-overload shutoff apparatus further comprising a manual override control for bypassing the timer device and the thermal safety device, the timer-thermal-overload shutoff apparatus further comprising a first current path through the timer device and the thermal safety device and a second current path that is independent of the timer device and the thermal safety device, wherein the manual override control can bypass the timer device and the timer-thermal-overload device to supply current directly to the electrical appliance.

* * * * *